United States Patent Office 2,864,751
Patented Dec. 16, 1958

2,864,751

PHOTOSENSITIVE COMPOUNDS AND PROCESS OF USING SAME

Lyman Chalkley, Prince Georges County, Md.

No Drawing. Application June 6, 1957
Serial No. 663,901

16 Claims. (Cl. 204—158)

The present invention relates to hydrophilic dye cyanides and, more particularly, to colorless hydrophilic cyanides of triphenylmethane dyes having at least one amino group para to the central methane carbon atom and a sulfonic acid group as a substituent of a benzyl group attached to an amino nitrogen atom.

It has long been known that certain of the triphenylmethane dyes which contain at least one amino group para to the central methane carbon atom form colorless, or nearly colorless, cyanides which in the presence of suitable organic activators become photosensitive to ultraviolet and shorter wave lengths of light to produce colored compounds but which are not sensitive to light in the visible range. Because of this property, the substances may be used in solution and absorbed or coated on a suitable base in the presence of an activator for the recording and measurement of ultraviolet radiation. Expensive equipment, such as quartz spectrographs and photoelectric meters, are ordinarily used to isolate this region.

Papers prepared from one of the photosensitive compounds and an activator therefor may be used in photographic and photo-duplication processes to print out images that are fully formed without development, that may be permanent and that may be examined in ordinary interior illumination without fixing. The papers employed retain their ultraviolet sensitivity after the printing of one image so that other portions may be printed on at a later date.

However, all of the previously known p-amino triphenylmethane dye cyanides have been hydrophobic in nature and are not activated by water so as to be photosensitive to ultraviolet and shorter wave lengths.

I have found that new compounds which comprise p-amino triphenylmethane dye cyanides having in the molecule at least one hydrophilic group, such as sulfonic acid, quaternary ammonium or hydroxyl groups, are hydrophilic in character and that the potential sensitivity to ultraviolet radiation possessed by the known hydrophobic dye cyanides is not lost in the new compounds. In fact, unlike the previous hydrophobic p-amino triphenylacetonitriles, the new compounds are activated by water, alone. It will be understood, of course, that more than one type of hydrophilic group may be present in the same molecule of dye cyanide. The p-amino groups may be primary, secondary, or tertiary in nature.

I have discovered one particular type of hydrophilic dye cyanide, the hydrophilic character of which is imparted by a sulfonic acid group, which strongly absorbs ultraviolet light to yield a compound having particularly high tinctorial power and strong color and which is highly stable at ordinary acidities. This type of hydrophilic dye cyanide also tends to be more soluble in water in its free acid form than other hydrophilic dye cyanides which derive their affinity for water from the presence of a sulfonic acid group. It is to be borne in mind in this regard that a substance can be "hydrophilic," that is, have an affinity for water and still be highly insoluble therein.

It is the object of the present invention to provide new triphenylacetonitriles having at least one amino group para to the central methane carbon atom which are hydrophilic and are activated by water to form compounds of high tinctorial power and strong color on exposure to ultraviolet and shorter wave lengths.

Another object of the invention is to provide hydrophilic p-amino triphenylmethane dye cyanides which are soluble in water to a considerable extent even in their free acid form.

A further object of the invention is to provide hydrophilic p-amino triphenylmethane dye cyanides which are hydrophilic and are activated by water to form on exposure to ultraviolet and shorter wave lengths, colored compounds which are highly stable at ordinary acidities.

Still another object of the invention is to provide a photochemical process employing the new dye cyanides.

Other and further objects of the invention will be apparent from the following detailed description.

It has been found that the water solubility of p-aminotriphenylacetonitriles containing sulfonic acid groups is much greater when the sulfonic acid group is a substituent, usually in the meta-position, of a benzyl group attached to one of the amino nitrogen atoms than when it is a substituent of a phenyl group attached to the central methane carbon atom.

The present compounds may have one, two or three p-amino groups, preferably two or three, and each amino group is, preferably, completely alkylated or aralkylated, i. e., tertiary amino. The compounds will also preferably have one or more sulfonic acid groups in addition to a sulfonic acid group associated with a benzyl group attached to an amino nitrogen atom and these additional sulfonic acid groups may also be attached to such a benzyl group or they may be a substituent of a phenyl group attached to the central methane carbon atom.

The sulfonic acid group of the new dye cyanides may exist in the free acid form or it may be combined with cations other than hydrogen. The sulfonic acid group is, itself, a highly ionized salt-forming radical. The essential part of the group, for the purpose of photoactivation, is the sulfonic ion $RSO_3^-$. This ion, because of its strongly hydrophilic character, confers the desired hydrophilic property upon the p-amino triphenylacetonitrile to which it is attached. However, the ion alone does not constitute a complete neutral molecule and, therefore, the sulfonic ion is always combined with an ion of opposite charge in a complete molecule. Thus, the sulfonic ion is combined with a cation which may be hydrogen or a metallic ion, or ammonium. Of course, when the cation is hydrogen, the acid may further combine to form a salt of an amino group within the molecule, itself.

The nature of the cation with which the sulfonic ion is combined is not at all critical in the new compounds of this invention. In aqueous solution in which these triphenylacetonitriles are photosensitive, the sulfonic group is largely ionized and the cation is no longer even a part of the molecule under the conditions in which the dye cyanides are utilized to take advantage of their photochemical properties. Therefore, any cation may be used with the sulfonic acid group to prepare a satisfactory hydrophilic dye cyanide.

For matters of convenience, selected ions are combined with these groups in the examples to be given later. In general, the principal considerations here relate to solubility. For example, certain of the free sulfonic acids, are so insoluble that if recrystallization techniques are employed for their purification, inordinately large quantities of solvent are necessary, whereas the alkali metal salts have the limited solubility necessary for efficient recrystallization. On the other hand, the free sulfonic acid form of certain other cyanides may be so soluble that it is impracticable to crystallize them from solution, whereas the potassium or strontium salts may have the desired limited solubility.

A compound of the present invention in which the aryl nuclei attached to the central methane carbon atom are unsulfonated has the general formula

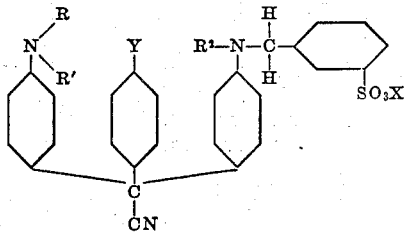

where R and R² are methyl or ethyl groups, R¹ is a methyl, ethyl or

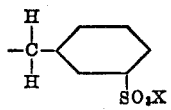

group and Y is hydrogen or an

group in which R³ and R⁴ are each methyl or ethyl groups and X is a cation.

As compounds within this general formula may be mentioned the cyanide of Colour Index No. 666, guinea green, the cyanide of Colour Index No. 698, acid violet S4B, and the cyanide of a closely related dye, acid violet 6B, Colour Index No. 697. As stated, these compounds are to be understood to include the salts as well as the free sulfonic acids.

The first of these compounds forms photosensitive solutions in water that yield a strong green color on exposure to ultraviolet and has the advantage of greater solubility under some conditions than the cyanide of helvetia green, making possible more sensitive preparations where a permanent green photoproduct is desired. The second compound, aside from forming photosensitive combinations with water, is remarkable for being quite sensitive to thermal hydrolysis in aqueous solution with formation of the violet dye, making it useful not only for actinometry and photography, but also for measurement by dye formation of the duration of heating of aqueous solutions.

The following examples illustrate the preparation of these new dye cyanides. The preparations described in these examples and all that follow should be carried out by yellow light such as the illumination of a Kodak OA safelight.

Example 1.—Cyanide of guinea green

A solution of 25 g. of commercial "acid green, ex. conc." (manufactured by the Ciba Company) in 250 ml. of boiling water is cooled to 40° C., filtered, and treated with a solution of 2 g. of 95% sodium cyanide in 15 ml. of water. The solution is allowed to stand in the dark at 25° C. for 24 hours and then treated in a good hood with 9 ml. of concentrated hydrochloride acid to precipitate the free acid of the dye cyanide having the formula

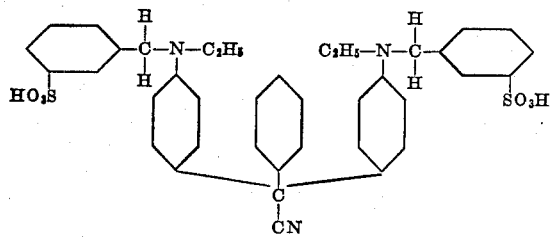

After the mixture has stood for another 30 hours in the dark at 25° C. the dark brown precipitate is collected on a filter, sucked as dry as possible, and air dried at room temperature to an amorphous mass, weighing about 14 g. This is purified by solution in 15 times its weight of boiling water, filtration of the hot solution, cooling, standing for one week and collection of the newly formed precipitate. This precipitate also is dried at room temperature. The dye cyanide free acid so obtained is a dark amorphous substance that yields nearly colorless solutions in water. These form a strong green color on irradiation with wave lengths shorter than 3350 A. The material is acid, and has an equivalence point for the neutralization of both sulfonic acid groups of approximately pH 8.

When the free acid is neutralized to pH 8 with sodium hydroxide, it is converted into a readily soluble disodium salt having the formula

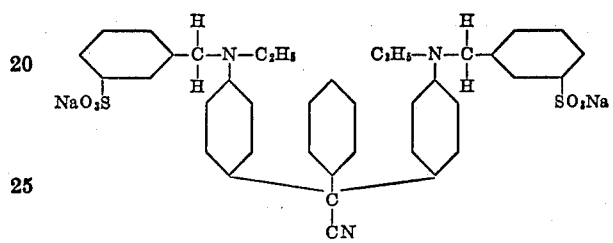

that also forms strongly photosensitive preparations. The corresponding barium salt is difficulty soluble in water, but still soluble enough to form photosensitive solutions.

Example 2.—Cyanide of acid violet S4B

A solution of 25 g. of acid violet 4BNS ex. conc. (manufactured by the Ciba Company) in 350 ml. of boiling water is filtered from a slight impurity, cooled to 38° C. and treated with a solution of 2.6 g. of 95% sodium cyanide in 15 ml. of water. The solution is cooled to 25° C. and allowed to stand in the dark for 24 hours, during which time a colorless precipitate forms. The solution is filtered from the precipitate, which is sucked as dry as possible on the filter and air dried to yield about 7 g. of the disodium salt of the compound having the formula

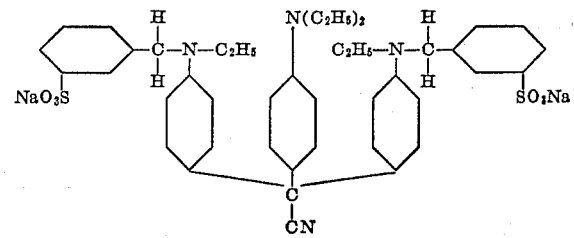

Another 8 g. may be recovered from the filtrate by addition of 350 ml. of saturated sodium chloride solution. This second crop is contaminated with parent dye or its base and needs to be purified by solution in 15 times its weight of boiling water, adjustment of the acidity to pH 5.6, boiling for 10 minutes, cooling to 50° C. and reprecipitation with a saturated aqueous solution of sodium cyanide. For precipitation the amount of sodium cyanide should equal the weight of the crude dye cyanide.

The product forms a solution in water that turns violet when exposed to ultraviolet radiation of wave length shorter than about 3300 A. The solution is also colored by heating it in the dark, the rate of the reaction increasing with the acidity of the solution. At pH 5.6 and 100° C. the monomolecular reaction constant is of the order of $10^{-4}$.

When the sodium salt is dissolved in 20 times its weight of boiling water, the solution cooled to 40° C. and treated with two equivalents of normal hydrochloric acid per molecule of compound, the free acid having the formula

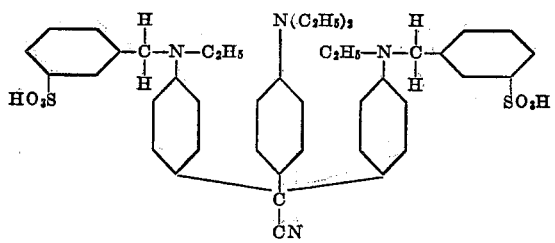

is precipitated as an amorphous material. This is slightly soluble in water to form a photosensitive solution, and is readily soluble in water containing hydrochloric acid or sodium hydroxide.

*Example 3.—Acid violet 6B cyanide*

The procedure described in Example 2 is applied to a closely related dye, acid violet 6B, Colour Index No. 697, to yield a compound having the formula

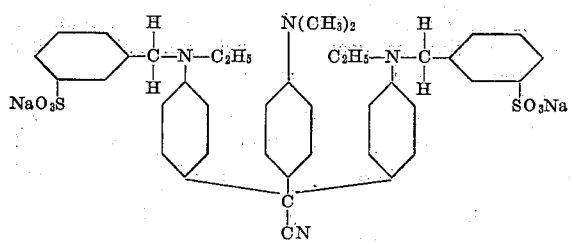

As stated earlier, the same molecule of hydrophilic dye cyanide may contain at least one sulfonic acid group attached to a substituent on one of the p-amino nitrogen atoms and at least one sulfonic acid group attached directly to one of the benzene rings attached to the central methane carbon atom. As specific examples of such compounds may be mentioned the cyanide of Colour Index No. 696, fast acid violet 10B, the cyanide of Colour Index No. 670, light green SF, yellowish, the cyanide of Colour Index No. 669, light green SF bluish, the cyanide of Colour Index No. 671, erioglaucine, and the cyanide of food, drug and cosmetic green No. 3.

The five compounds particularly named may be prepared in the following manner:

*Example 4.—Fast acid violet 10B cyanide*

A solution of 25 g. of commercial fast acid violet 10B in the form of Kiton fast violet 10B (manufactured by the Ciba Company) in 150 ml. of water heated to 90° C. is placed in a glass pressure bottle. To the bottle is added a solution of 2 g. of 95% sodium cyanide in 10 ml. of water. The bottle is sealed and heated at 100° C. for 3 hours. It is transferred to a dark place, allowed to cool and to stand at 25° C. for 24 hours. The bottle is then opened, the precipitate collected on a filter and dried without washing. This precipitate is the disodium salt having the formula

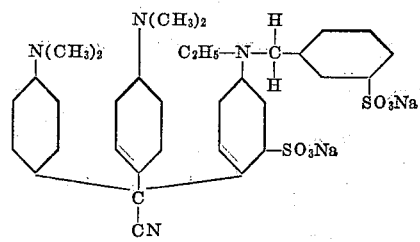

It is soluble in water to form a solution that colors violet on exposure to radiation of wave lengths shorter than about 3250 A.

The free acid having the formula

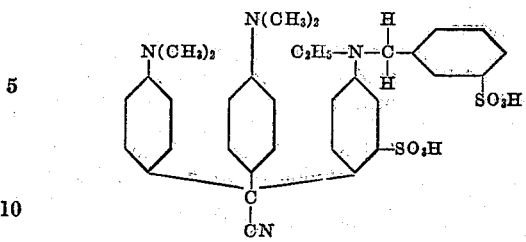

is obtained by treating a solution of 5 g. of the disodium salt in 70 ml. of water at 50° C. with 6.5 ml. of 2 N hydrochloric acid. The resulting solution is allowed to stand in the dark at room temperature for 4 days, the precipitate collected on a filter, washed with 20 ml. of cold water, and dried in the dark. The free acid so obtained is stable in the light and is pure enough for most purposes. To obtain it analytically pure it should be recrystallized from 500 times its weight of water. An aqueous solution of the free acid is colored violet by exposure to wave lengths shorter than about 3650 A.

*Example 5.—Light green SF yellowish cyanide*

A solution of 5 g. of Colour Index No. 670 (National Aniline light green SF yellowish Biological Stain) in 75 ml. of water is put in a presure bottle with one g. of 96% sodium cyanide, the bottle sealed and heated at 100° C. for one hour in the dark. After heating, the bottle is cooled, allowed to stand over night and opened. The solution is made just acid with 64% sulfuric acid added, drop by drop, to the first acid reaction. This operation is carried out in a good hood because hydrogen cyanide is evolved. The solution is then evaporated at 25–30° C. in vacuo to dryness, leaving an opaque tarry or glassy mixture of sodium sulfate and the sodium salt of the new compound which has the formula

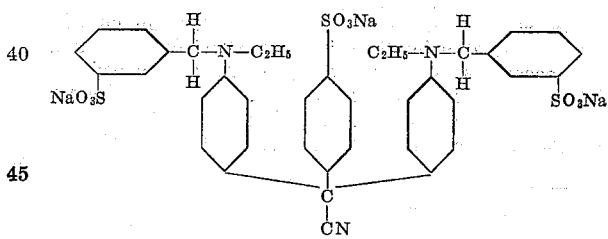

The dye cyanide is extracted from the sodium sulfate by successive 50 ml. portions of boiling i-propyl alcohol. The extracts are combined and evaporated to dryness, leaving the dye cyanide sodium salt as a clear hygroscopic glass. It is extremely soluble in water to form strongly photosensitive solutions.

*Example 6.—Light green SF bluish cyanide*

The same procedure used in Example 5 is applied to Colour Index No. 669 to produce the compound having the formula

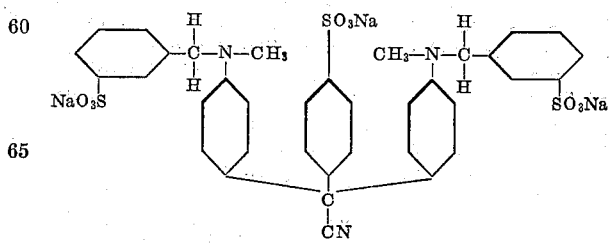

*Example 7.—Erioglaucine cyanide*

Twenty-five g. of Kiton pure blue L (manufactured by the Ciba Company) is put in a pressure bottle with 150 ml. of boiling water. The dye dissolves immediately. The solution is cooled to 80° C. and a solution of 3.4 g. of 95% sodium cyanide in 10 ml. of water is added, the bottle sealed immediately, and heated for one hour at 100° C.

After heating, the bottle is cooled to room temperature, opened, and the solution filtered from a trace of impurity, treated in a good hood with 6.5 ml. of concentrated hydrochloric acid and evaporated in vacuo at about 50° C. to a volume of 60 ml. The acidity of the somewhat viscous solution is adjusted with sodium hydroxide to pH 6.8. A solution of 22 g. of potassium chloride in 75 ml. of boiling water is then added and the resulting solution allowed to stand in the dark for a week with occasional stirring and scraping of the vessel walls to accelerate the very slow crystallization of the potassium salt which has the formula

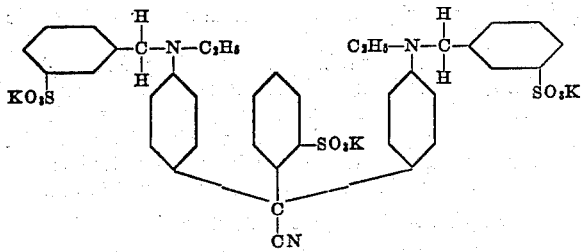

The precipitate is collected on a filter, washed with 25 ml. of aqueous 10% potassium chloride solution, sucked as dry as possible on the filter and dried in vacuo over sulfuric acid. The yield is about 15 g. of nearly colorless material. A second crop, though containing more dye, may be obtained by the addition of 22 g. more of potassium chloride to the mother liquor.

The potassium salt is very soluble in water to form a photosensitive solution that turns blue on exposure to ultraviolet.

A less soluble salt that can be recrystallized from water without the necessity of salting out may be made by treatment of a solution of 15 g. of the potassium salt in 100 ml. of water with 26 ml. of molar strontium chloride solution and allowing the solution to stand for one month with occasional stirring and scratching of the walls of the vessel. The precipitate is then collected and dried in a vacuum desiccator over sulfuric acid. It has the approximate composition represented by the formula

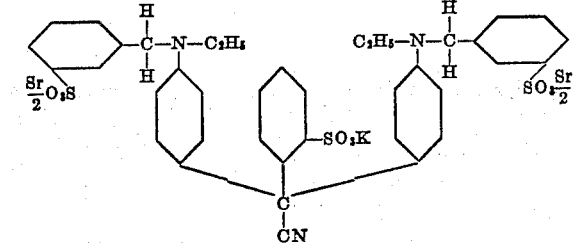

It may be recrystallized from 15 times its weight of water.

*Example 8.—Food, drug and cosmetic green No. 3 cyanide*

Twenty-five grams of food, drug and cosmetic green No. 3, assaying 87% dye, is dissolved in 125 ml. of boiling water and the solution filtered and placed in a pressure bottle. To the dye solution is added a solution of 5.5 g. of 97% sodium cyanide in 10 ml. of water. The pressure bottle is closed and heated at 100° C. for 2½ hours, and allowed to cool. To the resulting cold reaction solution is added in a good hood 8 ml. of concentrated hydrochloric acid to produce an acid reaction, and the solution then boiled until hydrogen cyanide has been expelled—about ½ hour. To the boiled and cooled solution 50% sodium hydroxide solution is added to a reaction of pH 8.5, and then is added a solution of 22 g. of strontium chloride hexahydrate in 25 ml. of boiling water. The mixture is allowed to cool and to stand at room temperature for 5 days. The precipitate that has formed is then collected on a filter, washed with 50 ml. of ice water, and dried at 110° C. to yield about 12 grams of the dye cyanide having the formula

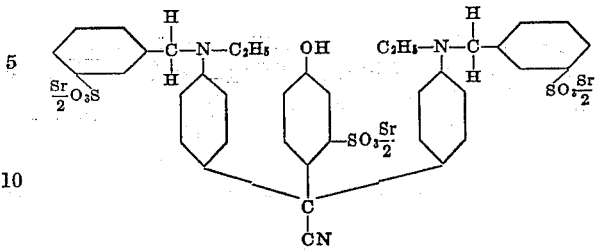

The substance may be further purified by recrystallization from water, although the recrystallization is slow, unless the product is salted out by a soluble strontium salt. The compound forms a solution in water that is strongly photosensitive, turning green on exposure to ultraviolet.

In addition to being activated by water, it has been found that all of the hydrophilic dye cyanides disclosed herein form photosensitive combinations with hydrocolloids as set forth in my application, Serial No. 542,479, filed October 24, 1955.

The present application is a continuation-in-part of my copending application, Serial No. 550,773, filed December 2, 1955, now abandoned.

I claim:

1. A hydrophilic cyanide of a p-amino triphenylmethane dye containing a sulfonic acid group as a substituent of a benzyl group attached to an amino nitrogen atom, said cyanide forming a colored compound when exposed in the presence of water to ultra-violet and shorter wave lengths.

2. The compound of claim 1 in which said sulfonic acid group is in the meta-position.

3. The hydrophilic cyanide having the formula

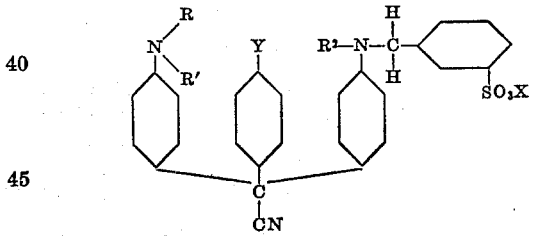

where R and R² are each selected from the group consisting of methyl and ethyl groups, R¹ is selected from the group consisting of methyl, ethyl and

groups, Y is selected from the group consisting of hydrogen and an

group in which R³ and R⁴ are each selected from the group consisting of methyl and ethyl groups and X is a cation.

4. The hydrophilic dye cyanide having the formula

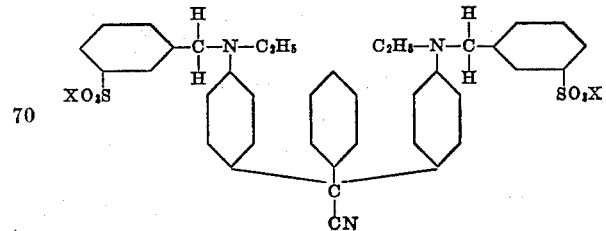

where X is a cation.

5. The hydrophilic dye cyanide having the formula

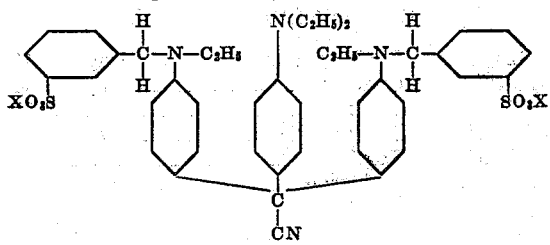

where X is a cation.

6. The hydrophilic dye cyanide having the formula

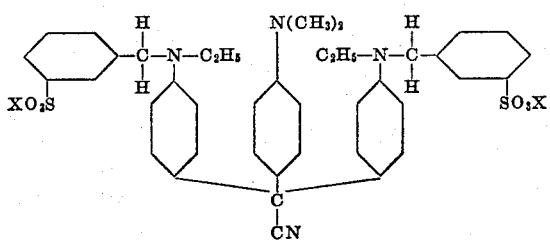

where X is a cation.

7. The hydrophilic dye cyanide having the formula

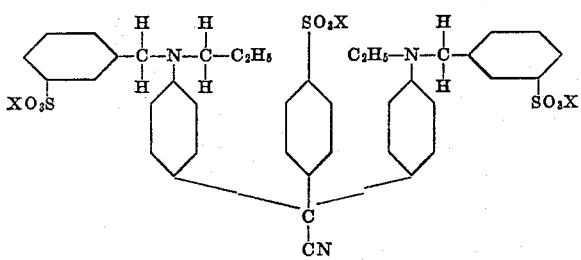

where X is a cation.

8. The hydrophilic dye cyanide having the formula

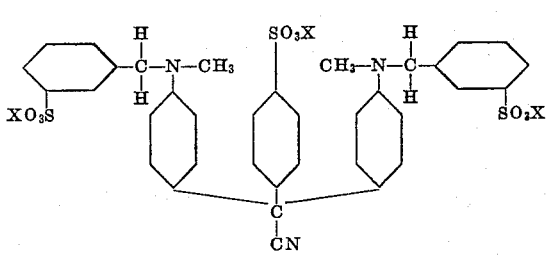

where X is a cation.

9. A process for forming a stable dye compound comprising irradiating with ultraviolet light in the presence of water, a hydrophilic cyanide of a p-amino triphenylmethane dye containing a sulfonic acid group as a substituent of a benzyl group attached to an amino nitrogen atom.

10. The process of claim 9 in which said sulfonic acid group is in the meta-position.

11. A process for forming a stable dye compound comprising irradiating with ultraviolet light in the presence of water a hydrophilic cyanide of a triphenylmethane dye having the formula

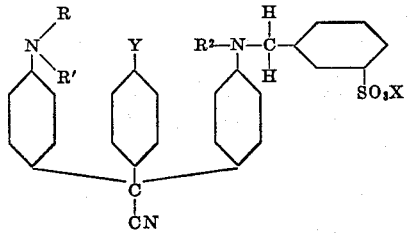

where R and R² are each selected from the group consisting of methyl and ethyl groups, R¹ is selected from the group consisting of methyl, ethyl and

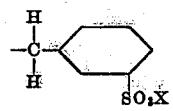

groups, Y is selected from the group consisting of hydrogen and an

group in which R³ and R⁴ are each selected from the group consisting of methyl and ethyl groups and X is a cation.

12. A process for forming a stable dye compound comprising irradiating with ultraviolet light in the presence of water a hydrophilic cyanide of a triphenylmethane dye having the formula

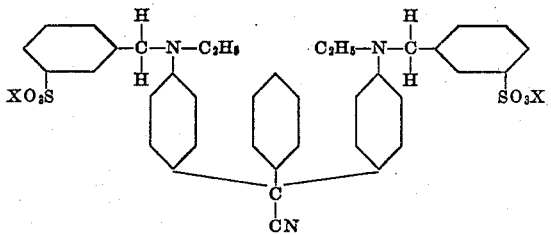

where X is a cation.

13. A process for forming a stable dye compound comprising irradiating with ultraviolet light in the presence of water a hydrophilic cyanide of a triphenylmethane dye having the formula

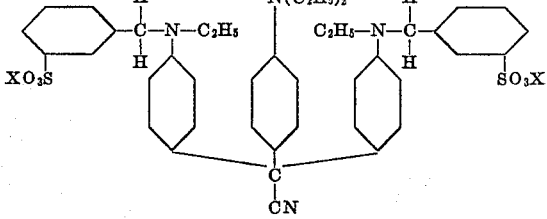

where X is a cation.

14. A process for forming a stable dye compound comprising irradiating with ultraviolet light in the presence of water a hydrophilic cyanide of a triphenylmethane dye having the formula

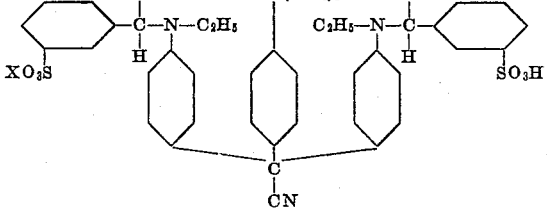

where X is a cation.

15. A process for forming a stable dye compound comprising irradiating with ultraviolet light in the presence of water a hydrophilic cyanide of a triphenylmethane dye having the formula

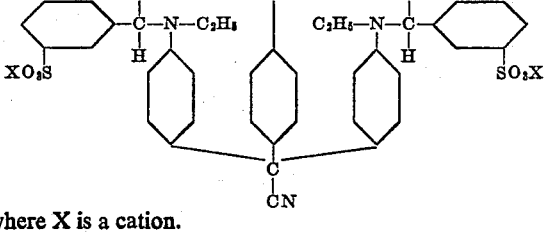

where X is a cation.

16. A process for forming a stable dye compound comprising irradiating with ultraviolet light in the presence of water a hydrophilic cyanide of a triphenylmethane dye having the formula
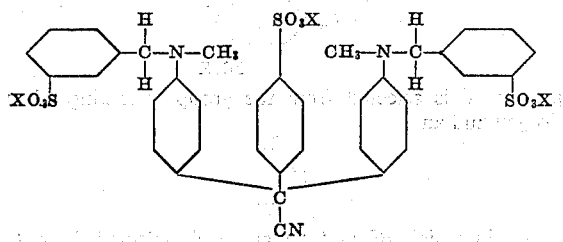
where X is a cation.
References Cited in the file of this patent
UNITED STATES PATENTS
| | | |
|---|---|---|
| 2,325,038 | Chalkley | July 27, 1943 |
| 2,441,561 | Chalkley | May 18, 1948 |
| 2,469,682 | Dickey | May 10, 1949 |
| 2,726,252 | Balon et al. | Dec. 6, 1955 |
| 2,732,337 | Togel | Jan. 24, 1956 |
| 2,734,027 | Nickerson | Feb. 7, 1956 |